United States Patent [19]
Gard

[11] Patent Number: 5,990,865
[45] Date of Patent: Nov. 23, 1999

[54] COMPUTER INTERFACE DEVICE

[76] Inventor: Matthew Davis Gard, 3015 County Sq. Dr. #2063, Carrollton, Tex. 76006

[21] Appl. No.: 08/778,978

[22] Filed: Jan. 6, 1997

[51] Int. Cl.⁶ ........................................................ G09G 5/00
[52] U.S. Cl. ............................ 345/156; 345/173; 345/358
[58] Field of Search ..................................... 345/156, 157, 345/173, 174, 358

[56] References Cited

U.S. PATENT DOCUMENTS

| | | |
|---|---|---|
| 4,808,979 | 2/1989 | DeHoff et al. . |
| 4,814,760 | 3/1989 | Johnston et al. .......................... 345/173 |
| 4,903,012 | 2/1990 | Ohuchi . |
| 5,101,197 | 3/1992 | Hix et al. . |
| 5,168,531 | 12/1992 | Sigel . |
| 5,319,387 | 6/1994 | Yoshikawa . |
| 5,325,133 | 6/1994 | Adachi . |
| 5,339,095 | 8/1994 | Redford . |
| 5,394,183 | 2/1995 | Hyslop . |
| 5,448,261 | 9/1995 | Koike et al. . |
| 5,453,758 | 9/1995 | Sato . |
| 5,483,261 | 1/1996 | Yasutake .................................. 345/173 |
| 5,502,459 | 3/1996 | Marshall et al. . |
| 5,502,803 | 3/1996 | Yoshida et al. .......................... 345/358 |
| 5,528,263 | 6/1996 | Platzker et al. .......................... 345/156 |
| 5,543,588 | 8/1996 | Bisset et al. ............................. 345/173 |
| 5,574,262 | 11/1996 | Petty ........................................ 345/173 |
| 5,757,361 | 5/1998 | Hirshik .................................... 345/156 |

*Primary Examiner*—Matthew Luu
*Attorney, Agent, or Firm*—Strasburger & Price, L.L.P.; Shireen Irani Bacon; Matthew J. Booth

[57] ABSTRACT

A user's movements are detected by a capacitive system having one or more conductors. The output from the conductors is amplified and compared to a table of stored output. Thus, the device can eliminate the need to touch a control surface. The control surface such as a computer mouse could be eliminated in favor of merely sensing a user's hand movement. Likewise, the array of conductors could be placed in a panel that could be mounted on a wall. Such panels could be used in a factory to sense the movement of workers or a machinery. Indeed, the movements could be analyzed and warnings sounded if a collision is predicted.

4 Claims, 12 Drawing Sheets

X-Axis Proximity Detector

Y-Axis Proximity Detector

Z-Axis Proximity Detector

COMPUTER INTERFACE DEVICE

TECHNICAL FIELD OF THE INVENTION

The present invention relates to a computer interface device for controlling the position of a cursor on a computer monitor. More generally, the device can be used to detect a user's position and translate this position into a distinguishable input for a computer.

BACKGROUND OF THE INVENTION

Most computers today use a "mouse" to control the location of a cursor on the screen. It is important to be able to quickly and accurately position the cursor, especially when working with programs having a graphical user interface. The mouse is a simple device which uses a roller ball. As the mouse is moved, the roller ball moves two perpendicular sensors. One sensor detects movement towards or away from the user. The other sensor detects movements to the left or right of the user. These movements can be referred to as measured on an x-y plane. Thus, even angular movements will produce both an x-component and a y-component. These values are then translated into movement of a cursor displayed on the monitor.

The mouse, while revolutionary in its day, has numerous mechanical parts which can break or malfunction. A common problem is the accumulation of lint, carried by the roller ball and lodged against the sensor. This prevents the sensor from properly recording the movement of the roller ball. Further, the ball can become irregular with time, making it more difficult to roll. Another problem occurs when the mouse is placed upon a smooth surface. Even if the surface of the roller ball is textured, it can slide rather than roll. Again the result is unpredictable movement of the cursor on the screen.

A final problem exists regarding a handicapped user's ease of use. If the user has no hands or has been crippled, a tactile device such as a mouse is difficult to manipulate. A need exists for a method and apparatus to control a cursor's position without the use of a tactile mechanical device. Such a device in a more generic sense could be used in any hand's free interaction with a computer. For example, a severely handicapped user should be able to manipulate the device with the movement of a straw-like extension held in his mouth.

Such a computer interface need not be solely restricted to the manipulation of a personal computer. Many industries have used automated machinery to improve the efficiency of their production. The machinery is controlled by a program. Safety hazards are presented when workers work in proximity to automated machinery. It would be beneficial to have a means to detect the location of a worker and alter the movement of the automated machinery to avoid that location.

Finally, a need exists for an input device which seamlessly integrates with modern three-dimensional graphic displays. For example, "virtual reality" goggles and autostereoscopic projection devices produce three-dimensional images. A new input device is needed which allows a user to interact with the image without invasive tactile attachments.

SUMMARY OF THE INVENTION

The present invention relates to a three dimensional, gesture recognizing computer interface. Its mechanical design allows its user to issue complex data to a computer without the use of a keyboard, a mouse, track-ball, or similarly tactile forms of cursor/input/tool control. Its desktop and laptop configurations are designed to contribute further to simplifying the workplace. The device can be attached to a keyboard or a monitor or any other location in proximity to the user.

The control device uses analog circuitry to determine the amplitude of change in the dielectric area of an orthogonal array of conductors. Changes in tank-oscillators within the analog circuit are produced when a person disturbs the equilibrium of the dielectric regions of the geometrically arranged conductor array. The control device typically guides a travel-vector graphic indicator as feedback to user gestures. In another embodiment, the sensitivity of the unit is increased to recognize specific smaller user gestures. Also known as pick gestures, a user could merely tap a finger downward to simulate the pressing of a mouse button instead of a larger arm-pointing gesture in a less sensitive embodiment.

In a broader application, a panel sensor can be placed on the wall of a room. The location of a user within the room can be detected. Multiple panels can be linked together to establish greater sensitivity and accuracy. One application of this configuration is safety on the factory floor. The panels can detect the presence of a worker and alter the path of automated machinery in order to protect the worker.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE DRAWINGS

Figure 1:
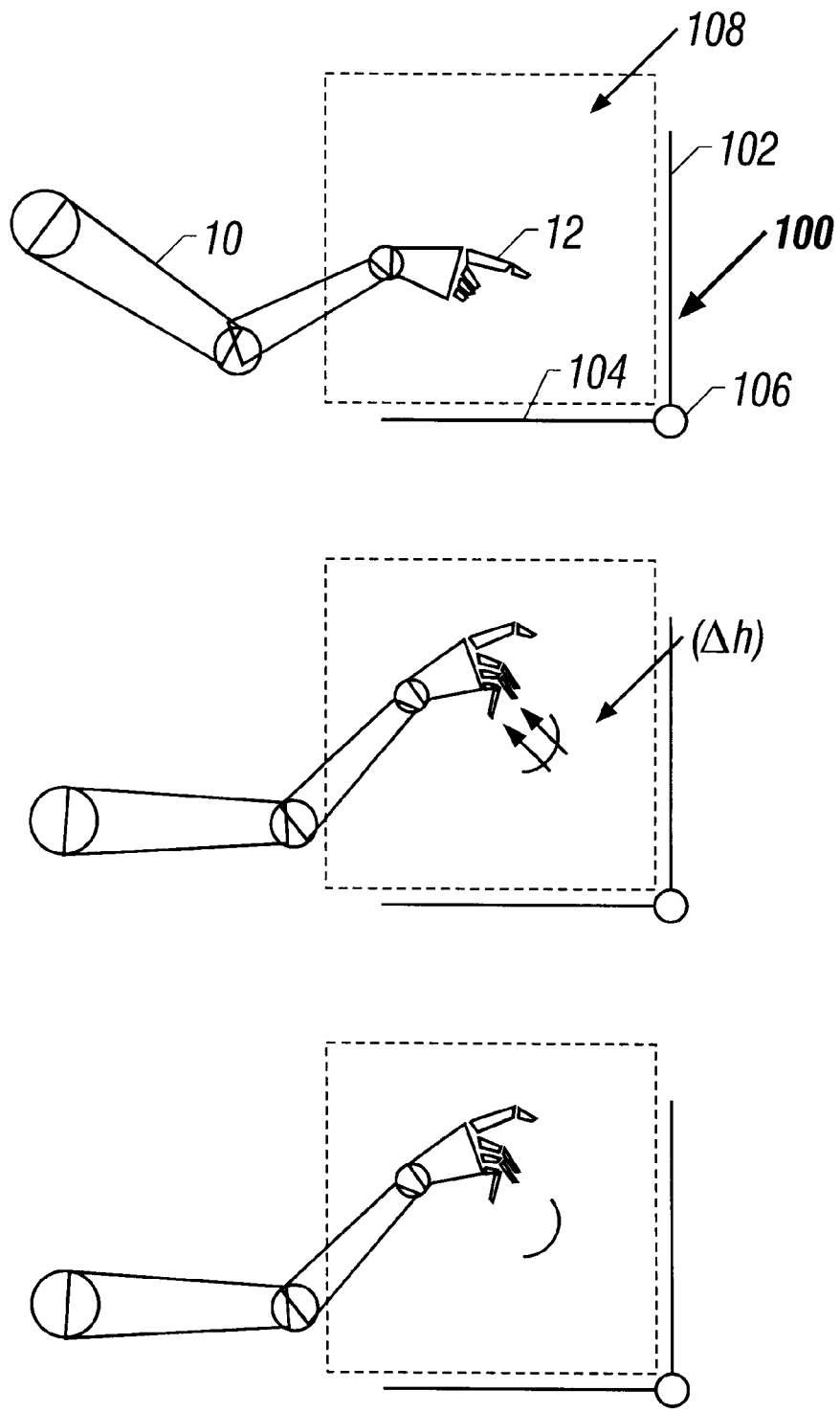
FIG. 1 illustrates the general motion of a user's hand being detected by the computer interface device of the present invention.
Figure 2:
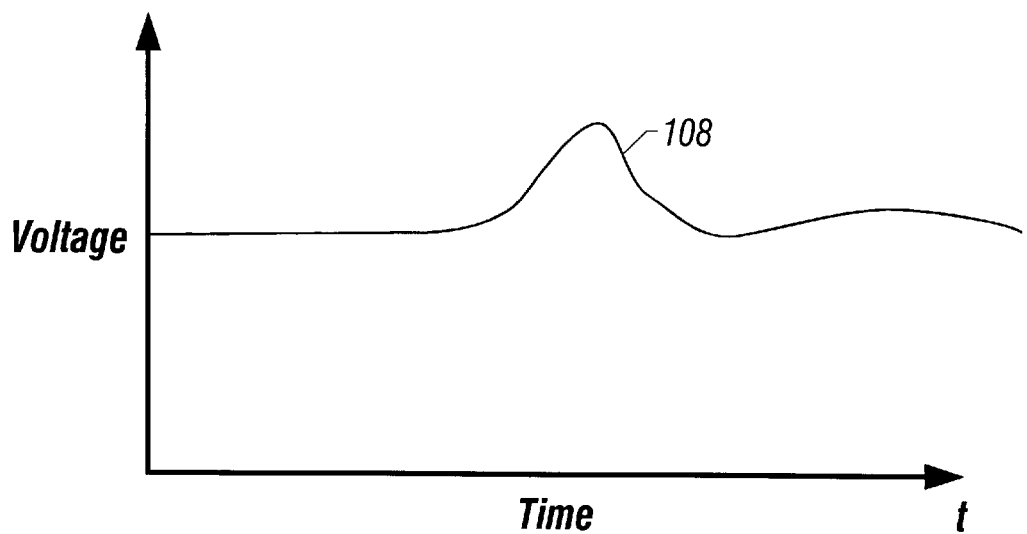
FIG. 2 is a graphical representation of the output from the detector circuit when a "bounce" is detected.

The present invention relates to a computer interface device and more generically to a control device which senses a user's movements to initiate control actions. FIG. 1 provides a general illustration of a user 10 gesturing within a field established by a first, second, and third conductors 102, 104, and 106. The third conductor 106 is extending from the page in the z-axis. The conductors establish a capacitance with the air acting as a dielectric. The dielectric constant is disturbed by the presence of the user's hand or other extremity. Alternatively, the user's hand or other extremity forms the second plats of the capacitor along with the conductor. Movement of the user then alters the capacitance of this capacitor as the body provides a virtual ground to close the circuit. For example, the movement of the user's finger 12 in the upward direction as shown in the second frame creates a disturbance or "bounce effect." A detector circuit will sense this change, for example, as a voltage bounce 108 as shown in FIG. 2.

Two of many types of gestures are illustrated by the two models:

Quadratic Fit: $y = a + bx + cx^2$

Sinusoidal Fit: $y = a + b^*\cos(cx + d)$ where "y" is the magnitude of the device output and "x" is an iteration, or unit of time.

"a" and "b" are the derived coefficients of the model based on the data.

If for example the user reaches toward a single conductor, and then withdraws, the gesture may modelled using the Quadratic form. If the user repeats the gesture continuously, the output would be modelled using the Sinusoidal form.

The two forms may be superimposed to scale upon the other. For example, were the user to reach out towards a single conductor and at some fixed point began fluttering his fingers, and then retract his hand, he would then need two samples: sample one, the entire gesture, and sample two, the disturbance to the Quadratic form of sample one. The fluttering fingers would be sinusoidal if the sample were to be reduced to just the oscillating fingers and not the broader arm gesture. Although it might be possible to model the system as a higher order differential equation, a programmer would choose to adjust the sampling to acquire key gestures and stimuli. For example, in the demonstration of reaching in, fluttering fingers, and then withdrawing, original Quadratic is disturbed. The wise programmer who fits the data to the quadratic will notice that the residuals of the function are oscillating and apply the second fit to the residuals over the disturbed sample area, thereby isolating and analyzing the embedded gesture in one step.

One of the most important issues that engineers must deal with today is the ergonomic qualities of their devices. Consumers are highly informed about the health problems caused by poorly designed, non-ergonomic products. From cars to computer keyboards, designers are obligated to take into consideration the user's comfort when designing a product. The utility of the control device 100 is that it is by nature ergonomic. The user does not impact any surface while using the device. The detector can also be refined to produce the desired output in response to comfortable performed motions by the user. Thus, if the control device is replacing a computer mouse, it need only be calibrated on several occasions before the user obtains an almost effortless ease in manipulating the cursor on the computer screen.

FIG. 3 is a schematic of a detector circuit suitable for the present invention. The three conductors 102, 104, 106 are attached to x-axis, y-axis, and z-axis proximity detector circuits 110, 112, 114, respectively. As each circuit is similar, only the x-axis circuit 110 will be discussed. The detector circuit 110 is a cascade amplifier utilizing BJT transistors. The circuit is supplied by a regulated voltage supply 116. The circuit shows the use of three BJTs 120, 122, and 124. In a preferred embodiment, BJTs 120, 122 are model MPS3704, while BJT 124 is a model 2N3904. The biasing voltages can be adjusted through the use of various resistors and capacitors. Preferred values are shown. The input from the conductors are conditioned and amplified by the three proximity circuits 110, 112, 114. The output from the circuits are provided through the axis data information lines 118 to the computer.

Within the computer, the analog output signal is converted into a digital signal which can be manipulated. The analog to digital (A/D) resolution is important to the Control device in several ways. The further the stimulus is away from the receiver ($\Delta h$ is large) the smaller the change in voltage ($\Delta V$) sent from the analog circuit to the A/D. Therefore the A/D must be sensitive enough to detect the minute changes in the fringe region of the orthogonal array. The ideal control device has operating conditions residing solely in its optimal region where little or no resolutional nonlinearity occurs. Since a completely linear-unified 3D region-model for the array is desirable, the greater the resolution of the A/D, the greater the robust range of input.

Alternatively, a circuit that directly measures the oscillator frequency would provide a more sensitive (and probably easier to linearize) means of measuring position. In this case, the oscillator output would be fed directly into a frequency to digital converter (F/D). This can be implemented in the computer. The F/D converter would simply involve gating the oscillator into a counter for a fixed interval, T. The contents of the counter N would be related to the oscillatory frequency, f by $f = N/T$. This process would be repeated with sufficient frequency, perhaps one hundred times per second, so that the output would, for the purposes of display or control, be continuous.

Since the actual change in capacitance caused by insertion of hands (or other objects) into a region of sensitivity is very small, perhaps of the order of $10^{-8}$ farads, the nominal or "undisturbed" frequency of the oscillator must be made relatively high. This is done to achieve a suitably large frequency swing when the region is "disturbed" by the presence of hands. The total frequency swing thereby becomes suitably large in an absolute sense, but is still very small as a percentage of the "undisturbed" or nominal oscillator frequency.

The overall sensitivity of the system can be enhanced by heterodyning the output of each variable oscillator with a common fixed oscillator, then using the resulting difference frequency for measurement purposes. To illustrate this, consider an undisturbed frequency of 1.1 megaHertz ($1.1 \times 10^6$ cycles per second) and a maximum frequency swing, created by disturbing the field, of 10 kiloHertz (10,000 cycles per second). This amounts to a total frequency swing of less than one percent. If, however, the oscillator output is heterodyned with a fixed one megaHertz signal, the resultant undisturbed frequency is 0.1 megaHertz (or 100 kiloHertz) and the frequency swing of 10 kiloHertz (which is unchanged) is equivalent to ten percent, a ten-to-one improvement in sensitivity.

Figure 4:
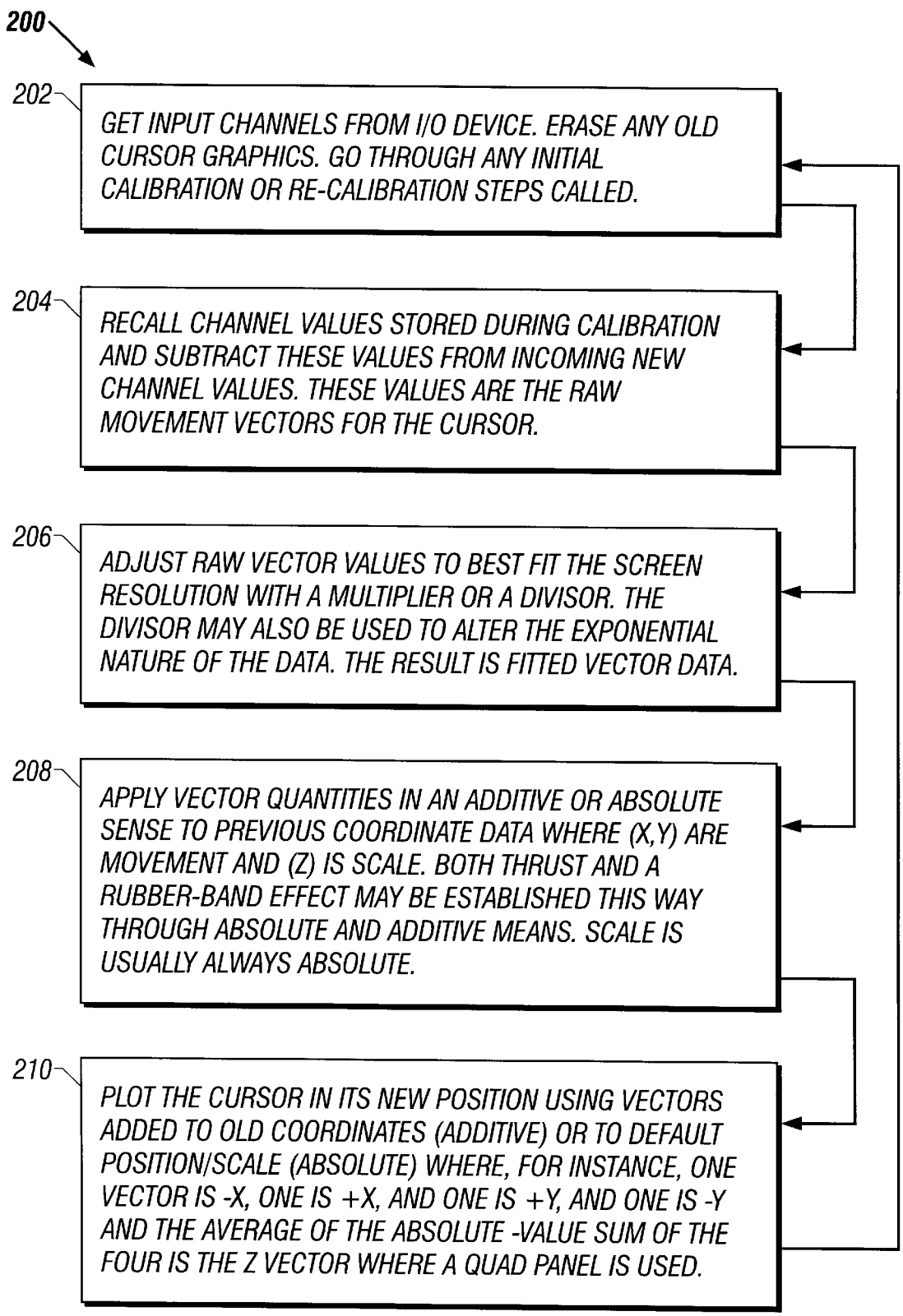
FIG. 4 is a flow chart illustrating the software interpretation of the circuit output.

FIG. 4 is a flow chart 200 which diagrams the interaction between the data collected from the conductors and the software program that translates that data into cursor positioning or other control actions. The input data 202 is initially collected and stored in a buffer. An initial calibration is then performed, establishing output limits based upon the input. The new data is then compared to the values used during the calibration. The differences are then used to create vector data 204 used to create new cursor position output. This raw vector data is then sized to best fit the monitor 206. Next, the vector quantities are applied 208 in an absolute sense to previous coordinate data. For example, the x-axis and y-axis values can be position or movement data. Z-axis values can be interpreted as scale values. Next, the cursor is plotted 210 in its new position using the vectors added to its old coordinates, additive method, or to a default position, absolute method.

Figure 5A:
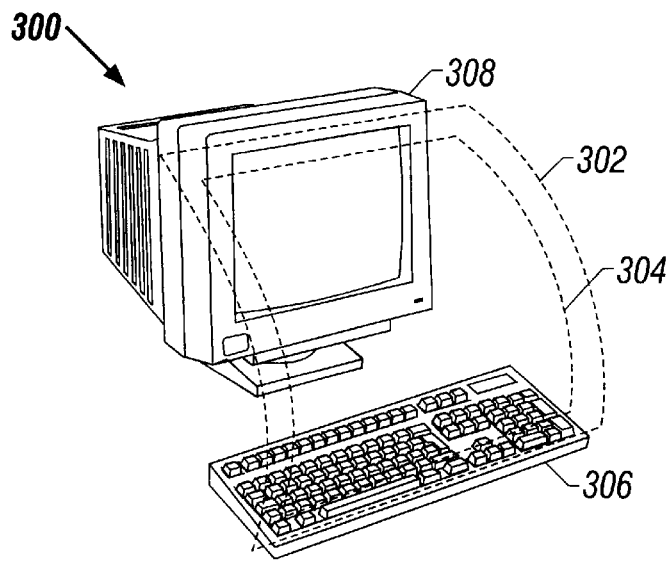
FIGS. 5a, 5b and 5c illustrate a monitor mounted embodiment of the present invention.

FIG. 5a is a preferred method of implementing the interface device to a personal computer. The apparatus 300 produces overlapping input and output regions 302, 304, using a first and second array of conductors 306, 308. Each array of conductors can contain any number of conductors, although four conductors is preferred. The first set of arrays 306 can be placed on the front of the monitor, while the second set can be placed on the keyboard. The user can then pass his hand or any other device in the overlapping field where it will be detected.

Figure 5B:
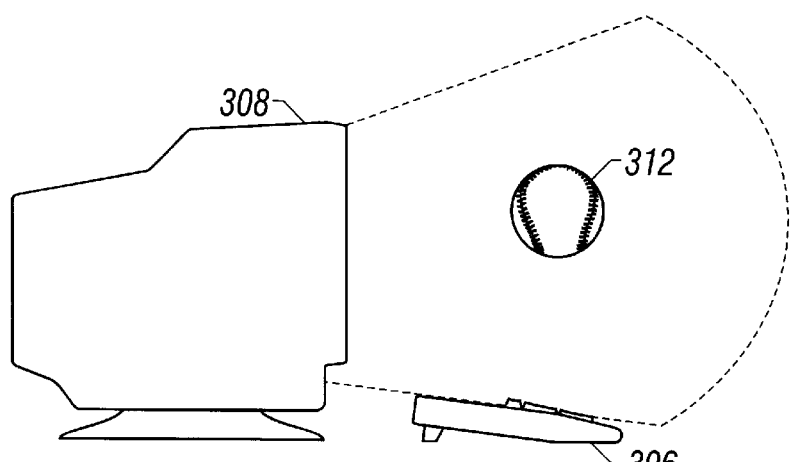
Figure 5C:
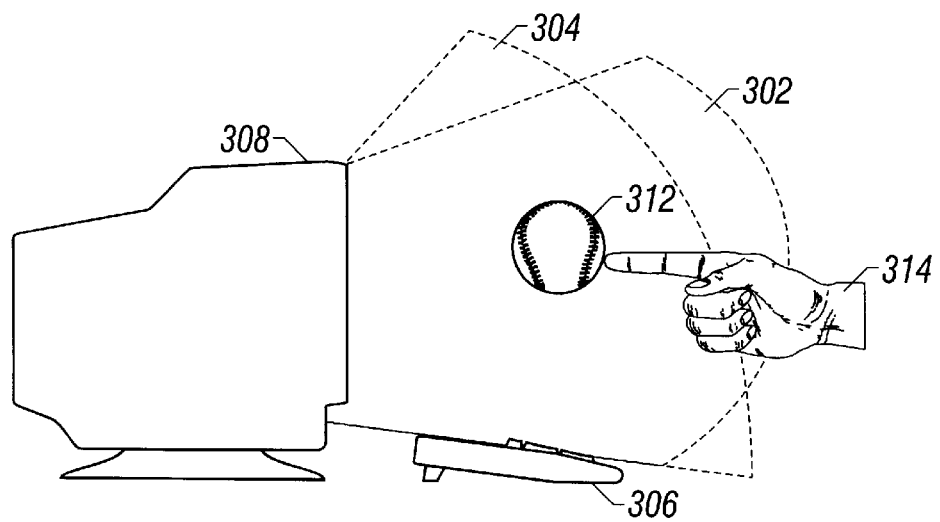

FIGS. 5b and 5c illustrate the use of the invention with an autostereoscopic display. Such displays can produce a three dimensional illusion or perceived image in front of the display. Such displays are produced by Neos Technology of Melbourne, Fla. In the example, a tennis ball 312 is displayed within the region banded by output regions 302, 304. Thus a user 314 can extend his hand into this bounded region and interact with the three-dimensional display. The location of his hand is detected and the illusive ball 312 can respond to the illusion of touch.

Figure 6:
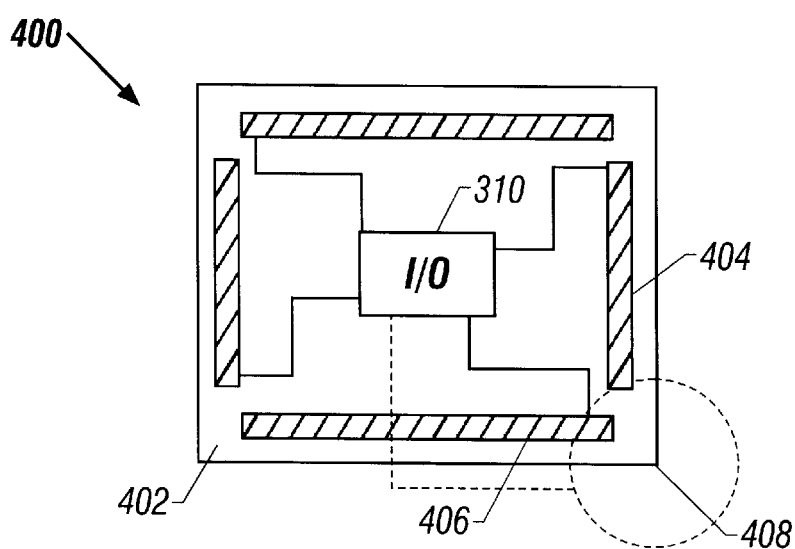
FIG. 6 illustrates a wall panel embodiment of the device.
Figure 3A:
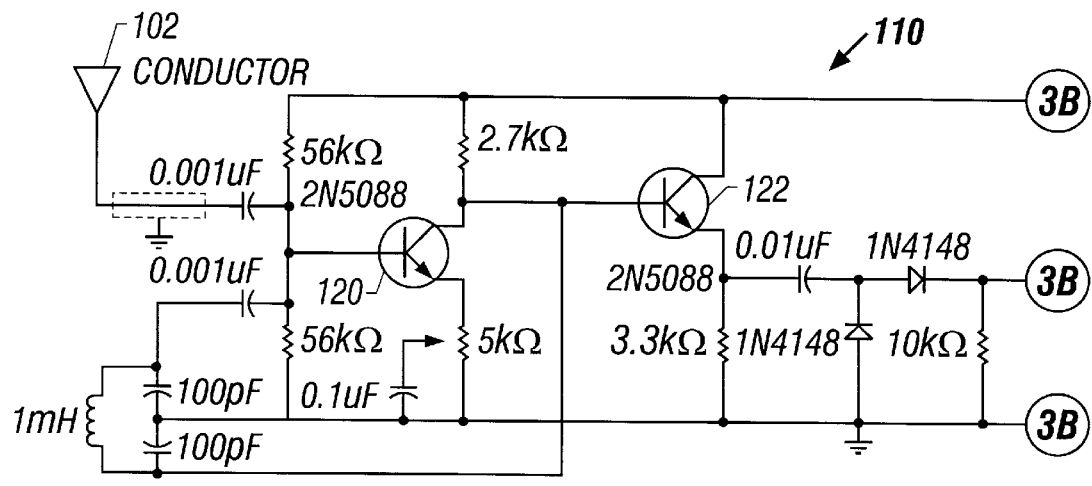
FIG. 3 is a schematic of the detector circuit.
Figure 3A:
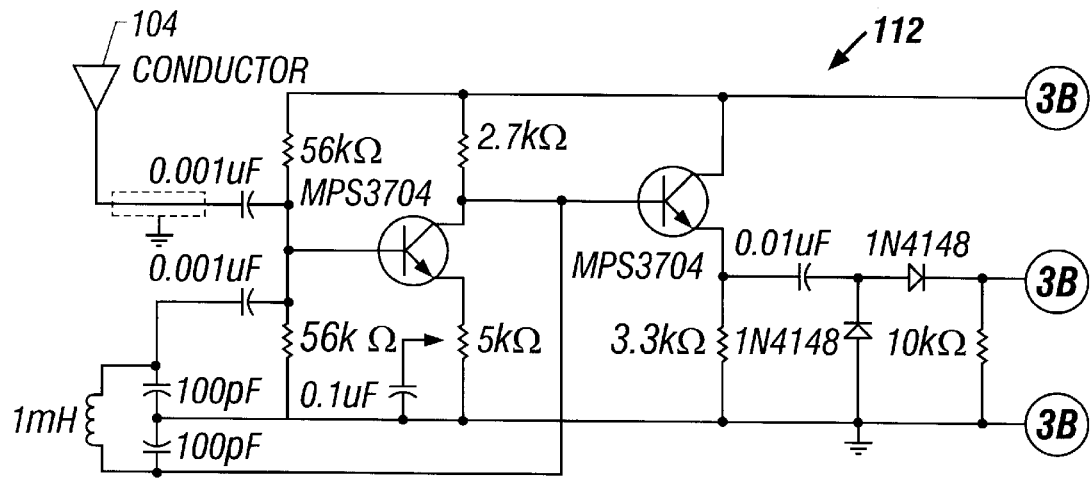
Figure 3A:
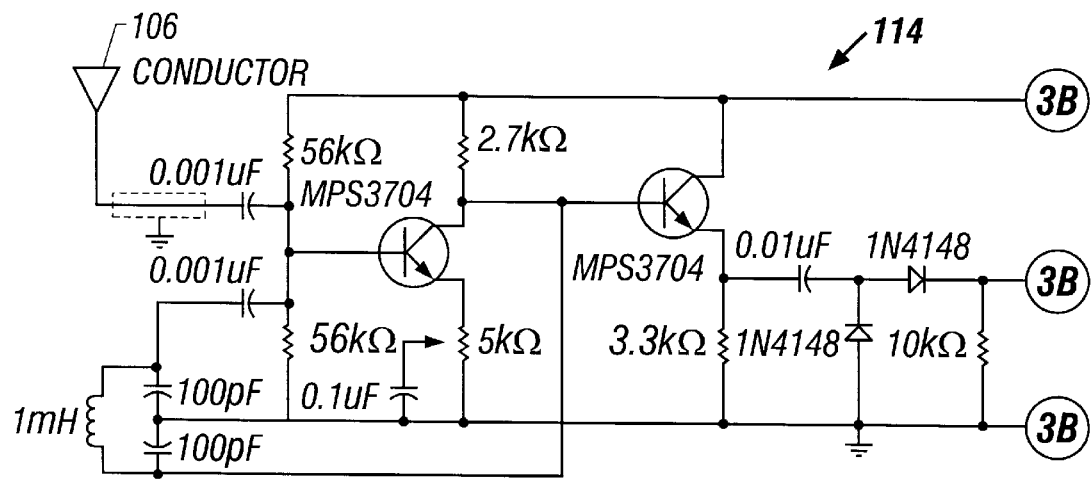
Figure 3B:
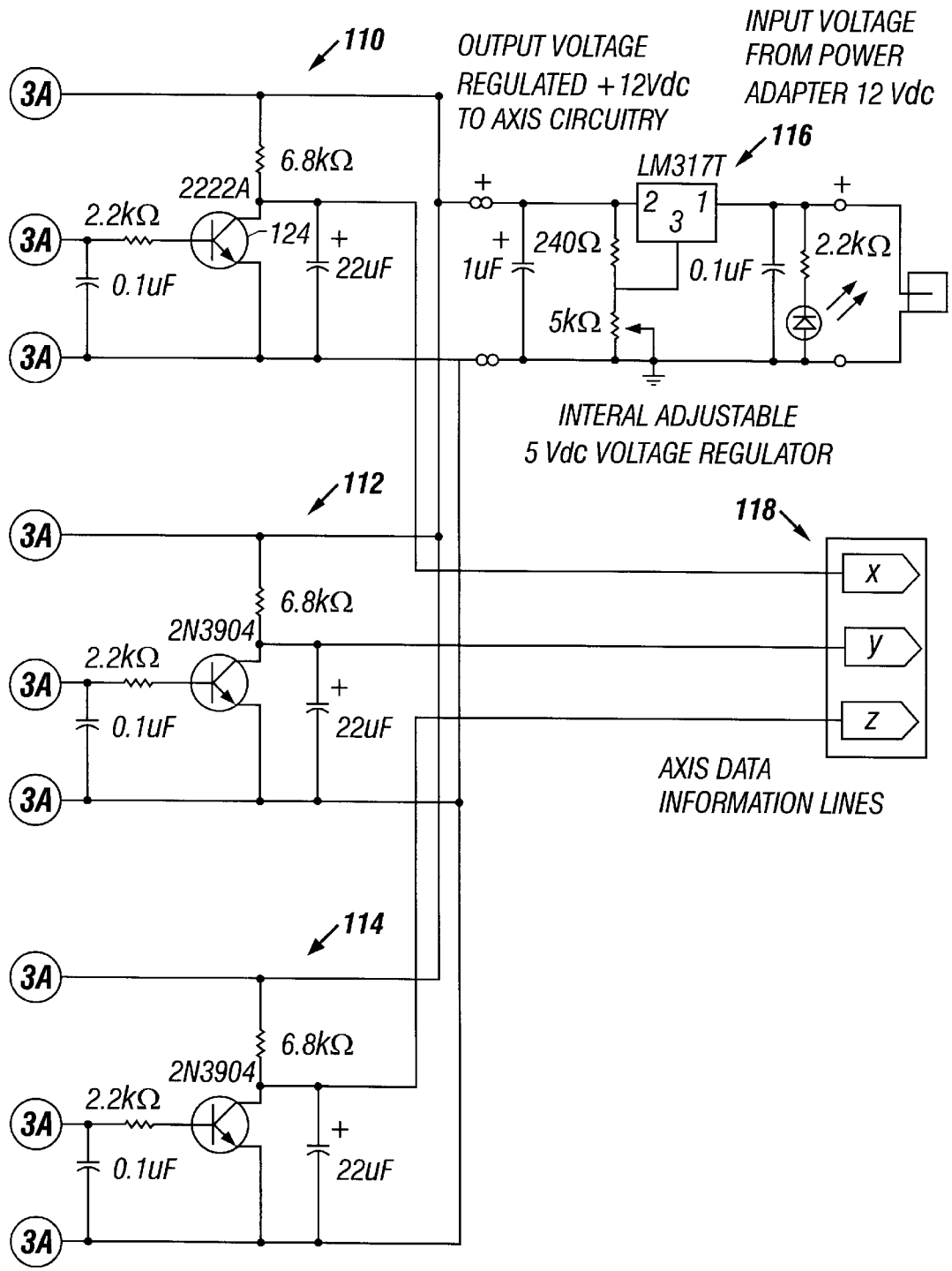
Figure 7C:
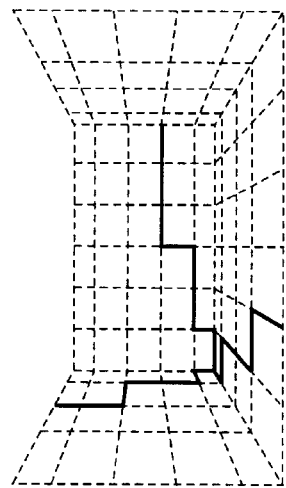
FIGS. 7a to 7h illustrate a plurality of wall panel elements used to scan for movement within a room.
Figure 7B:
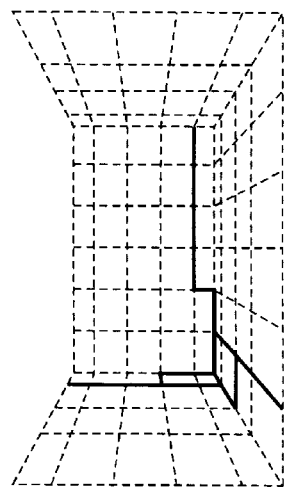
Figure 7A:
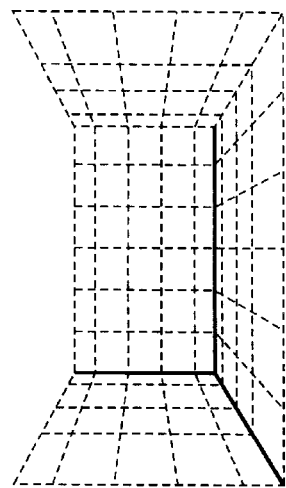
Figure 7E:
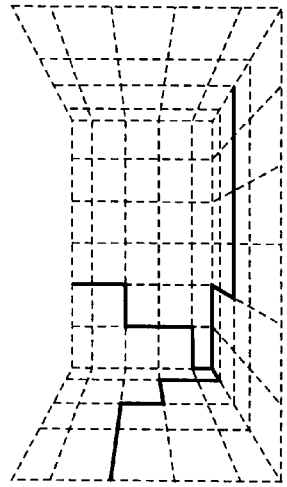
Figure 7D:
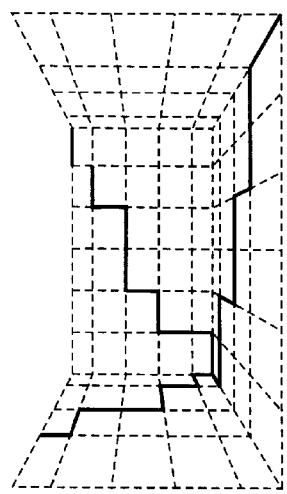

FIGS. 6, 7a, and 7b illustrate the use of a multi-conductor panel 400. The panel 400 has any outer surface 402. On the outer surface, at least two conductors are 404, 406. The conductors are connected to a central input/output controller 310. Thus any capacitance disturbance detected by the conductors 404, 406 can be relayed to a detector circuit such as described above. Further, the panels can be connected to each other with a data bus 408. Thus, an entire room can be paneled with detector panels 400. The panels 400 room can be interrogated with various patterns to detect the location and limits of movement of a device within the room. For example, in FIG. 7a, only the conductors on the panels which represent the very axes of the room are activated. Sequentially, the pattern can be changed to include the conductors illustrated in FIGS. 7b, 7c, 7d, and 7e.

Figure 7F:
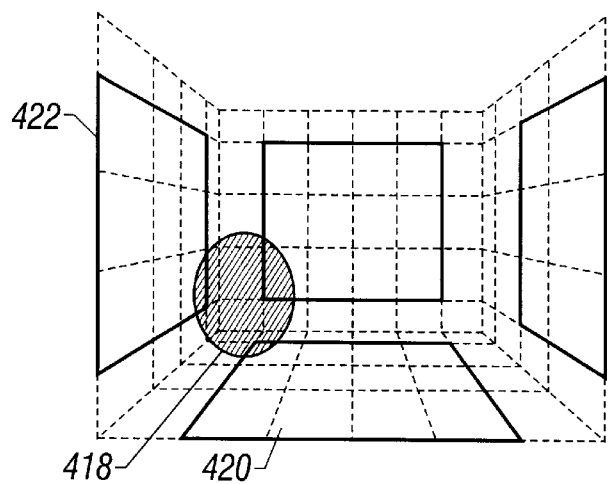
Figure 7G:
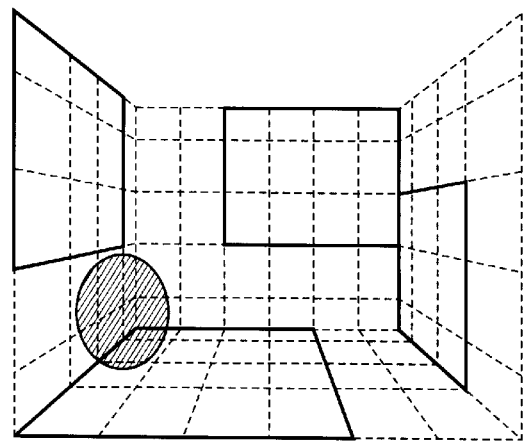
Figure 7H:
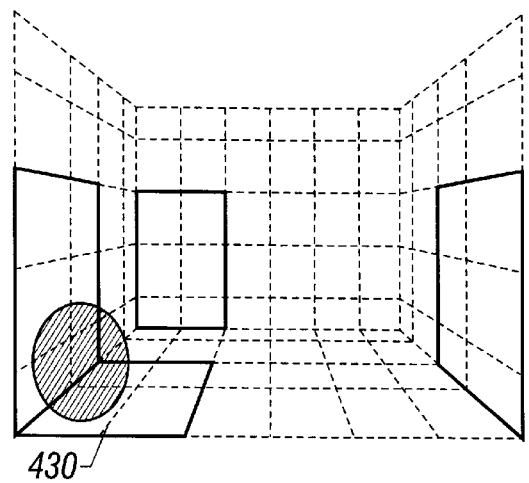

Once connected, the panels can also be segmented to create specialized quadrants. For example, as shown in FIG. 7f, if the room contained an automated machine 418, the panels closest to the machine's operating motion 420, 422 might be used to create the most accurate detection of motion. Further, as shown in FIG. 7h, if more than one object is moving in the room, e.g. a worker near the machine, then two detection groupings 430, 432 could be analyzed.

Figure 8:
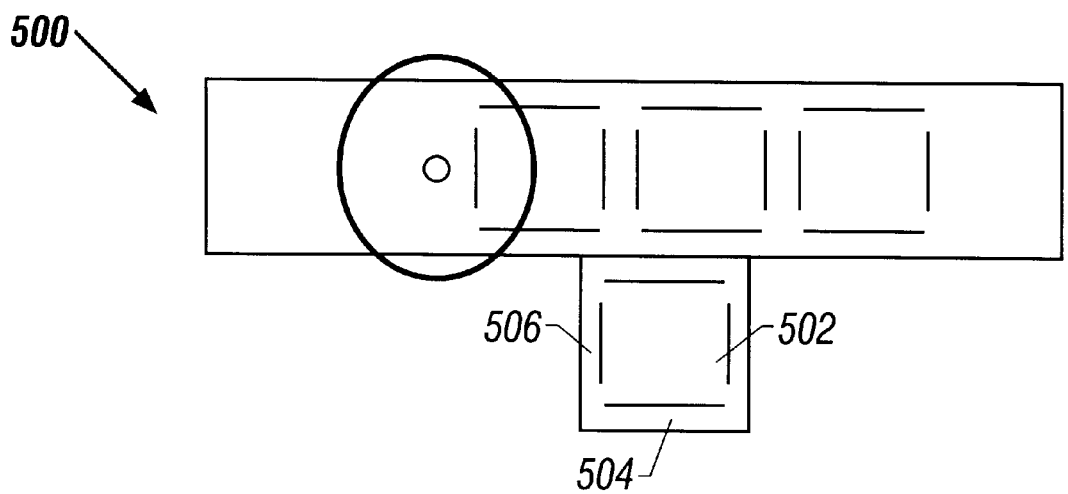
FIG. 8 illustrates the use of detectors on the dash of an automobile to eliminate the need for certain manual controls.

FIG. 8 illustrates the use of the detectors in an automobile interior. An exemplary dashboard 500 could have virtual controls that were activated by the movement of a driver's hand. The dashboard could contain a plurality of conductor arrays 502, each with at least two conductors 504, 506. If the array 502 represented the radio control, a user could adjust volume by pulling his hand away from the array, and change channels by using a recognized hand gesture such as the formation of a J-shape with outstretched fingers. Of course the choice of commands and functions can vary.

Figure 9:
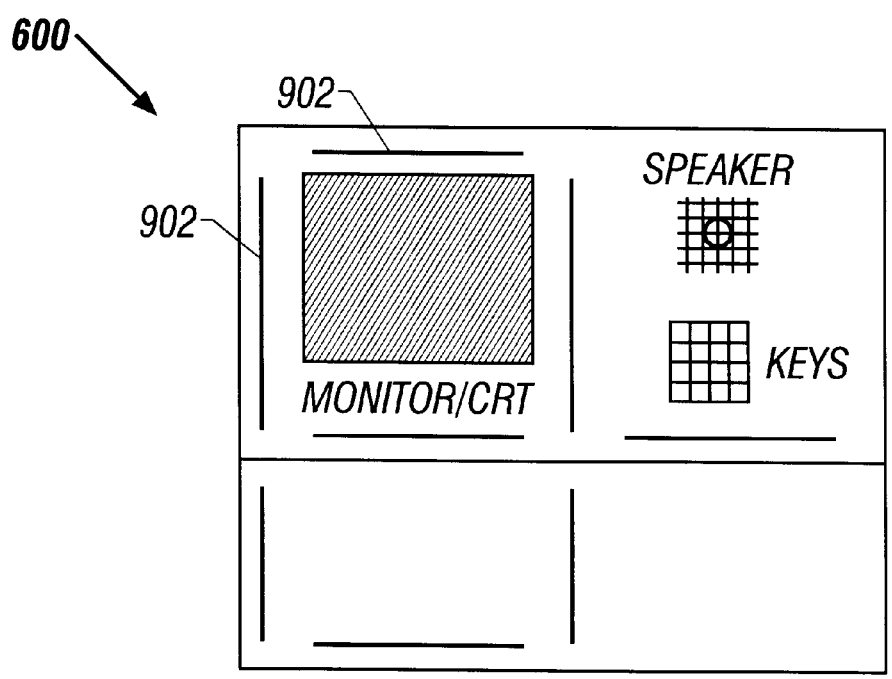
FIG. 9 illustrates the use of detectors on an automatic teller machine.

FIG. 9 illustrates the use of a conductor array 902 at an automated teller machine 600. This might be particularly useful for the blind. A blind user could approach the automated teller machine. When detected, the user could move his hand toward a desired key and be guided by a volumed plurality of tones. As he neared the key, for example, the volume could increase or the plurality of tones may be in unison when they were otherwise dissonant.

Figure 10:
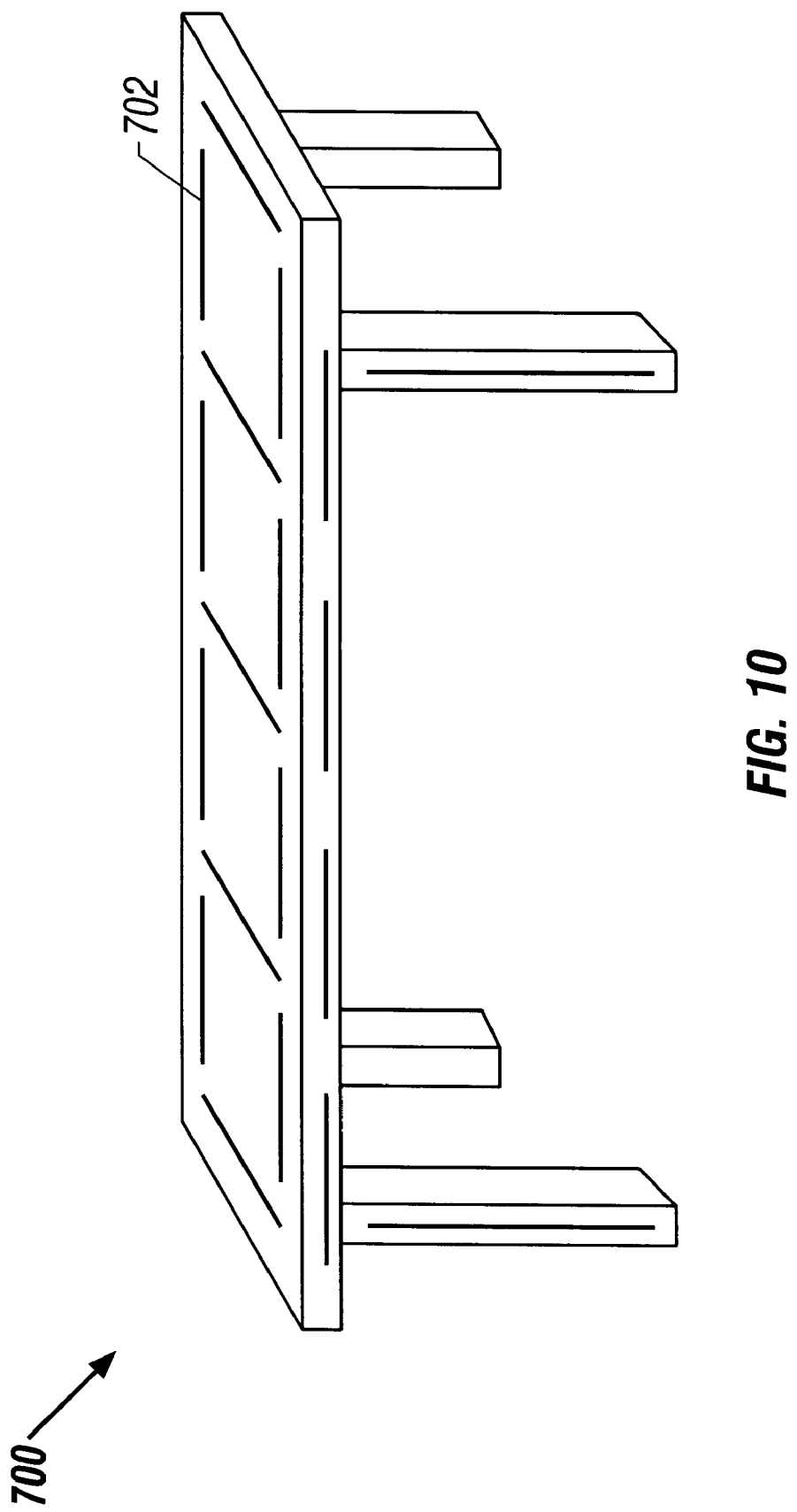
FIG. 10 illustrates a table with a plurality of motion detectors mounted thereon.

FIG. 10 illustrates a work table 700 containing at least one set of conductor arrays 702. Machinery could be mounted on the table and monitored. Likewise, as on a work floor, the interaction of human operators and machinery could be monitored. Thus, if it appears that the worker might be injured by the movement of the machinery, then the movement can be altered or the machine powered down.

Figure 11:
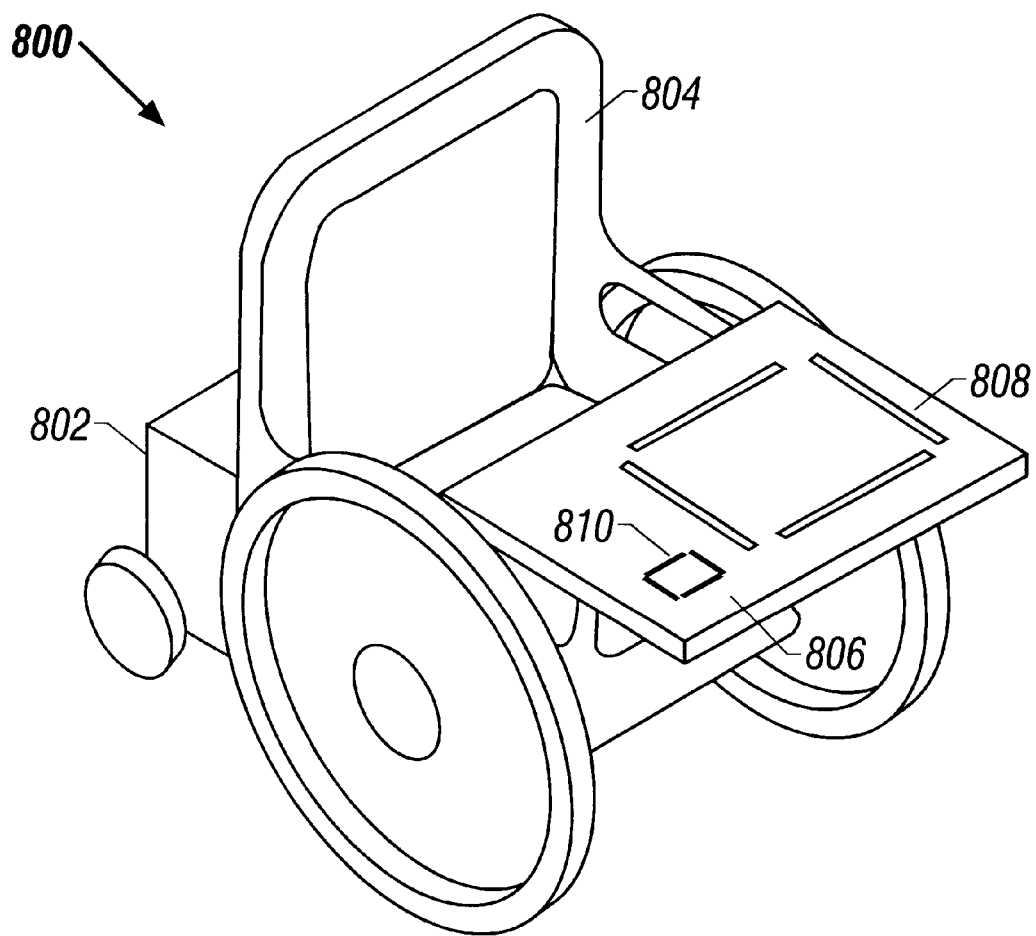
FIG. 11 illustrates a motorized wheel chair having an array of conductors.

FIG. 11 illustrates a motorized wheel chair 800 for use by a handicapped person. The wheel chair has a seat 804 connected to several wheels which are powered by a motor 802. The chair 800 typically has a desk top surface 806. Prior art motorized chairs typically have a simple lever controller. The user presses the lever forward to move the wheel chair forward. The user moves the lever to the side to move the wheel chair to the left or right. The use of a movement detector can replace a lever arrangement so long as there is a limiting filter present to subdue the "bounce"-like signal produced if the moving chair were to hit a bump to prevent erroneous control input while the chair is in motion. For instance, a first array 810 can replace the lever controller. The user would merely manipulate his hand or other object within the range of the conductors. The changing capacitive field will be interpreted as discussed above. A second conductor array 808 can be placed on the desk top as well. The desktop can be shielded to prevent the user's leg movement from affecting the field around the conductors.

Figure 12:
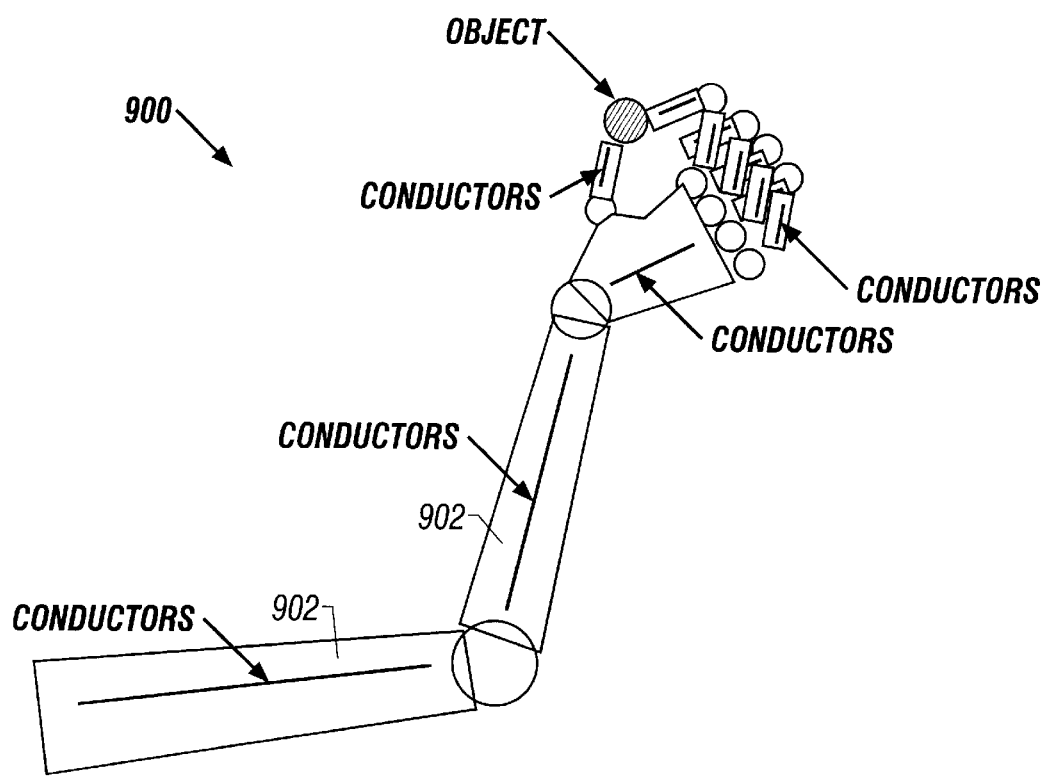
FIG. 12 illustrates a robotic arm having detectors mounted thereon.

FIG. 12 illustrates an embodiment of the invention wherein the conductors are placed on the moving armature of a machine. In this example, the conductors 900 are placed on a robotic arm 900. In the past examples, the conductors have been placed on a stationary object. This example illustrates that the opposite arrangement can also work. In other words, the robotic arm can be in movement around a stationary workpiece that will be detected.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the appended claims.

I claim:

1. A control device for translating a user's non-tactile movement into a control action comprising:

(a) a surface connected to a first conductor for sensing the user's non-tactile movement within a first plane along a first axis of the surface;

(b) a second conductor connected to said surface, said second conductor being used for sensing the user's non-tactile movement within a second plane along a second axis, perpendicular to the first axis of the surface;

(c) a third conductor connected to said surface, said third conductor being used for sensing the user's non-tactile movement within a third plane along a third axis, perpendicular to the first and second axis of the surface;

(d) means for translating the sensed movement into three-dimensional vector data; and (e) means for correlating said three-dimensional vector data into control movement.

2. The control device of claim 1 wherein said translating means comprises circuitry to determine the change in voltage in the dielectric area of said first, second, and third conductors.

3. The control device of claim 1 wherein said translating means comprises circuitry to measure the change in the frequency of said first, second, and third conductors.

4. The control device of claim 3 wherein said translating means further comprises heterdoyning said frequency with a fixed oscillator.

* * * * *